United States Patent
Adey et al.

(10) Patent No.: US 9,931,647 B2
(45) Date of Patent: Apr. 3, 2018

(54) MAGNETIC SEPARATOR AND RELEASE TOOL THEREFOR

(71) Applicant: Adey Holdings (2008) Limited, Cheltenham (GB)

(72) Inventors: Christopher Adey, Cheltenham (GB); Matthew Taylor, Cheltenham (GB); Simon Downie, Cheltenham (GB); Kashem Pathan, Cheltenham (GB)

(73) Assignee: ADEY HOLDINGS (2008) LIMITED, Cheltenham (GB)

( * ) Notice: Subject to any disclaimer, the term of this patent is extended or adjusted under 35 U.S.C. 154(b) by 101 days.

(21) Appl. No.: 14/439,059

(22) PCT Filed: Nov. 4, 2013

(86) PCT No.: PCT/GB2013/052880
§ 371 (c)(1),
(2) Date: Apr. 28, 2015

(87) PCT Pub. No.: WO2014/068339
PCT Pub. Date: May 8, 2014

(65) Prior Publication Data
US 2015/0290655 A1 Oct. 15, 2015

(30) Foreign Application Priority Data

Nov. 2, 2012 (GB) .................................. 1219752.1
May 21, 2013 (WO) ................ PCT/GB2013/051329
(Continued)

(51) Int. Cl.
*B04C 5/14* (2006.01)
*B03C 1/02* (2006.01)
(Continued)

(52) U.S. Cl.
CPC ............ *B04C 5/14* (2013.01); *B01D 21/0009* (2013.01); *B01D 21/2411* (2013.01);
(Continued)

(58) Field of Classification Search
CPC .. B04C 5/14; B04C 3/06; B04C 5/185; B03C 1/02; B03C 1/14; B03C 1/30;
(Continued)

(56) References Cited

U.S. PATENT DOCUMENTS 2,577,034 A * 12/1951 Quinlan .................... E06B 9/02
160/217
2,737,204 A * 3/1956 La Bonte .............. F16L 3/1091
138/112
(Continued)

FOREIGN PATENT DOCUMENTS

DE 4310795 C1 7/1994
FR 2693662 A1 1/1994
(Continued)

*Primary Examiner* — David C Mellon
*Assistant Examiner* — Liam Royce
(74) *Attorney, Agent, or Firm* — Michael E. Dockins; Shumaker, Loop & Kendrick, LLP

(57) ABSTRACT

A magnetic separator for a central heating system comprises a housing, a separation chamber within the housing, and inlet and outlet ports extending from the housing. The inlet and outlet ports include push-fit connectors having collets surrounding the mouth of each of the inlet and outlet for releasing the connectors. The magnetic separator also has a release tool. The release tool has first and second bearing areas for bearing against the collets of the inlet and outlet connectors, and a handle region for enabling force to be applied, via the bearing areas, to both connectors simultaneously.

16 Claims, 9 Drawing Sheets

(30) Foreign Application Priority Data

May 21, 2013 (WO) ................ PCT/GB2013/051330
Oct. 7, 2013 (GB) .................................. 1317652.4

(51) Int. Cl.

| | | |
|---|---|---|
| C02F 1/48 | (2006.01) | |
| B03C 1/14 | (2006.01) | |
| B03C 1/30 | (2006.01) | |
| F16L 21/00 | (2006.01) | |
| F16L 29/00 | (2006.01) | |
| B01D 21/26 | (2006.01) | |
| B04C 5/185 | (2006.01) | |
| B04C 3/06 | (2006.01) | |
| E03B 7/07 | (2006.01) | |
| B01D 21/24 | (2006.01) | |
| B01D 35/06 | (2006.01) | |
| B01D 35/30 | (2006.01) | |
| B21D 39/04 | (2006.01) | |
| B03C 1/0355 | (2006.01) | |
| B03C 1/28 | (2006.01) | |
| F17D 3/16 | (2006.01) | |
| F24D 19/00 | (2006.01) | |
| B01D 29/90 | (2006.01) | |
| B01D 21/00 | (2006.01) | |
| F16L 55/24 | (2006.01) | |
| C02F 101/20 | (2006.01) | |

(52) U.S. Cl.
CPC ......... *B01D 21/2483* (2013.01); *B01D 21/26* (2013.01); *B01D 21/267* (2013.01); *B01D 29/908* (2013.01); *B01D 35/06* (2013.01); *B01D 35/303* (2013.01); *B03C 1/02* (2013.01); *B03C 1/0355* (2013.01); *B03C 1/14* (2013.01); *B03C 1/286* (2013.01); *B03C 1/288* (2013.01); *B03C 1/30* (2013.01); *B04C 3/06* (2013.01); *B04C 5/185* (2013.01); *B21D 39/044* (2013.01); *C02F 1/488* (2013.01); *E03B 7/074* (2013.01); *F16L 21/00* (2013.01); *F16L 29/007* (2013.01); *F17D 3/16* (2013.01); *F24D 19/0092* (2013.01); *B01D 21/0042* (2013.01); *B01D 2201/302* (2013.01); *B01D 2201/4023* (2013.01); *B01D 2221/02* (2013.01); *B03C 2201/18* (2013.01); *B03C 2201/20* (2013.01); *B03C 2201/28* (2013.01); *C02F 2101/203* (2013.01); *C02F 2201/48* (2013.01); *C02F 2303/22* (2013.01); *F16L 55/24* (2013.01); *Y10T 137/794* (2015.04)

(58) Field of Classification Search
CPC ....... B03C 1/0355; B03C 1/288; B03C 1/286; B03C 2201/20; B03C 2201/18; B03C 2201/28; C02F 1/488; C02F 2101/203; C02F 2201/48; C02F 2303/22; E03B 7/074; B21D 39/044; F17D 3/16; B01D 21/2411; B01D 35/06; B01D 35/303; B01D 29/908; B01D 21/267; B01D 21/2483; B01D 21/0009; B01D 2201/4023; B01D 2201/302; B01D 21/0042; B01D 2221/02; B01D 35/30; B01D 35/306; B01D 21/26; F24D 19/0092; F16L 55/24; F16L 21/08; F16L 33/04; F16L 9/006; F16L 21/00; F16L 29/007; Y10T 137/794
USPC .................................................. 29/706; 49/34
See application file for complete search history.

(56) References Cited

U.S. PATENT DOCUMENTS

| | | | | |
|---|---|---|---|---|
| 4,005,883 | A * | 2/1977 | Guest | F16L 37/0845 285/322 |
| 4,881,573 | A | 11/1989 | Durant et al. | |
| 5,028,318 | A * | 7/1991 | Aslin | B01D 21/02 209/725 |
| 5,201,552 | A * | 4/1993 | Hohmann | F16L 33/213 285/120.1 |
| 5,507,529 | A * | 4/1996 | Martins | F16L 37/56 285/124.2 |
| 6,155,140 | A | 12/2000 | Tsai | |
| 6,499,769 | B1 * | 12/2002 | Vieregge | B21D 39/044 285/197 |
| 7,052,051 | B2 * | 5/2006 | Gaffe | F16L 37/12 285/124.1 |
| 2005/0167352 | A1 | 8/2005 | Burrows et al. | |
| 2008/0000820 | A1 * | 1/2008 | Mitchell | B01D 35/147 210/141 |
| 2010/0300988 | A1 * | 12/2010 | Clausen | B01D 35/16 210/777 |

FOREIGN PATENT DOCUMENTS

| | | | | |
|---|---|---|---|---|
| GB | 1520742 A | * | 8/1978 | ......... F16L 37/0845 |
| GB | 2231516 A | | 11/1990 | |
| GB | 2453008 A | | 3/2009 | |
| GB | 2465547 A | | 5/2010 | |
| GB | 2469145 A | | 6/2010 | |
| GB | 2467136 A | | 7/2010 | |
| WO | 0045937 | | 8/2000 | |
| WO | WO 2012073029 A1 | * | 6/2012 | ......... B01D 21/0009 |

* cited by examiner

MAGNETIC SEPARATOR AND RELEASE TOOL THEREFOR

CROSS-REFERENCE TO RELATED APPLICATIONS

This application is a National Stage of International Application No. PCT/GB2013/052880, filed Nov. 4, 2013, which claims priority to GB 1317652.4, filed Oct. 7, 2013, and to International Application No. PCT/GB2013/051329 and International Application No. PCT/GB2013/051330, both filed May 21, 2013, and also to GB 1219752.1, filed on Nov. 2, 2012. The entire disclosures of the above applications are hereby incorporated herein by reference.

FIELD OF THE INVENTION

The present invention relates to a magnetic separator for use in a central heating system and in particular to a magnetic separator release tool.

BACKGROUND TO THE INVENTION

Magnetic separators are now widely fitted to domestic and commercial central heating systems. The separators remove debris, and particularly magnetic debris, from the heating fluid. This keeps the heating fluid clean, preventing build-up of debris in, for example, the boiler, where it may cause expensive damage.

When a heating system is serviced, the magnetic separator must be cleaned to remove the particles which have been separated from the fluid. A removable screw-top is typically provided at the upper end of a cylindrical housing which, when removed, allows access to the inside of cylindrical housing. A removable insert is typically provided within the housing, which can then be removed for cleaning.

The removable insert is typically of similar longitudinal extent to the cylindrical housing. Therefore to allow the insert to be removed from the housing, the separator device must be installed where there is a vertical space between horizontal surfaces of at least twice the height of the housing. This requirement imposes an unwelcome constraint on the installer in terms of where the device may be installed, particularly where the separator device is being retrofitted to an existing installation. For example, there is often insufficient space between the bottom of a boiler and a counter top. In some cases it may simply not be possible to fit a device of suitable capacity which requires such a large vertical space.

As an alternative to servicing a magnetic separator in situ, the separator can be removed from the heating circuit for cleaning. This may obviate the need to provide a vertical space which is tall enough to disassemble the separator. However, existing separators are usually fitted to the central heating circuit via screw connectors, which may be awkward to connect and disconnect when they are located behind a separator. The seal of the screw connection may also deteriorate with repeated disconnection and reconnection, and there is always a risk that the screw thread will be damaged during connection/disconnection. Also, the inlet and outlet ports on the magnetic separator are typically plastic, and torsional force on the ports to disconnect and reconnect from the pipe may cause weakness or cracks in the separator housing over time, resulting in leakage. If a separator housing becomes cracked, then it is unlikely that an effective repair will be possible, and the separator will have to be replaced.

Quick-release push-fit fittings are available, for example JOHN GUEST SPEEDFIT® connectors. These connectors are designed for repeated use, and do not have the above mentioned disadvantages of screw connectors. The push-fit connectors include collets which surround the inside of the female part of the connector, and which grip onto the male part when the parts of the connector are pulled away from each other. The connection is released by pushing the collet inwardly of the female part, away from the male part. The parts of the connector must then be pulled away from each other, whilst holding the collet in this position.

The problem with using quick-release push-fit connectors such as those described above is that it is difficult to release the connectors when they are behind a magnetic separator and located in close proximity to pipes and walls. It is especially difficult to release more than one connection.

It is an object of this invention to provide a separator device which reduces or substantially obviates the above mentioned problems.

STATEMENT OF INVENTION

According to a first aspect of the invention, there is provided a magnetic separator for a central heating system, the magnetic separator including:
 a housing,
 a separation chamber within the housing,
  inlet and outlet ports extending from the housing, the inlet and outlet ports including push-fit connectors having collets surrounding the mouth of each of the inlet and outlet for releasing the connectors,
  and a release tool, the release tool having first and second bearing areas for bearing against the collets of the inlet and outlet connectors, and a handle region for enabling force to be applied, via the bearing areas, to both connectors simultaneously.

A locking member may be provided, for locking the release tool in a position where force cannot be transmitted to the collets via the bearing areas. The locking member may engage with part of the separator housing, preventing further movement of the release tool towards the housing.

A locking member serves to prevent accidental release of the magnetic separator from the heating circuit. Such accidental release would be highly undesirable since a large amount of dirty water may be released from the heating circuit, causing damage to property.

The locking member may be extendable from the release tool, for example the locking member may be a screw threaded stop and may extend from the handle region of the release tool. In use, the extendable locking member may be extended from one side of the release tool to abut the outer surface of the housing of the magnetic separator, preventing movement of the release tool towards the separator housing. A screw thread provides a convenient adjustment means, allowing the locking member to be screwed securely against the body of the connected device when required.

In use, the locking member blocks movement of the handle region and prevents operation of the release lever.

Alternatively, the locking member may be a pin, the release tool and separator housing each having at least one aperture for receiving the pin, the aperture(s) of the release tool being aligned with the aperture(s) of the housing in a position where the release tool is spaced from the housing and the bearing areas of the release tool are not applying force to the collets, the release tool being movable to apply force to the collets only when the pin is removed from the apertures.

The pin may include a locking formation for locking the pin within the apertures. The locking formation may be of a bayonet type, and may include a longitudinal passage extending from an end of the pin, along a surface of the pin, and a circumferential passage extending from the longitudinal passage, the circumferential passage being spaced from the end of the pin. A corresponding detent may be provided on the, or one of the, aperture(s) in the release tool or the separator housing, the detent extending inwardly from a periphery of its associated aperture. In this way, the pin may be inserted through the aperture, with the longitudinal passage on the surface of the pin aligned with the detent in the aperture.

Advantageously, two or more substantially similar formations may be provided on the pin, around the circumference of the pin, and a corresponding number of detents may be provided around the aperture. With two similar formations, the pin only ever needs to be rotated a maximum of a quarter turn from any position before the longitudinal passages in the pin align with the detents in the aperture.

The pin may be tapered. At least one of the apertures in the release tool and/or separator housing may also be tapered, allowing the pin to be introduced only in one direction.

An O-ring of rubber or similar material may be provided in a circumferential indent around a part of the pin. The O-ring provides for a positive 'click' when the pin is inserted through the aperture(s) of the release tool and the aperture(s) of the separator housing.

The release tool and magnetic separator housing may be provided with co-operating guide formations on one side of the tool and housing. The formations on one side ensure that the release tool can only be fitted to the housing one way around. This ensures that, where detents are provided on an aperture of the release tool for interacting with the locking formation of a tapered pin, the aperture with detents will be on the correct side, bearing in mind the taper of the pin and corresponding taper in the aperture of the housing.

The co-operating guide formations, tapered pin with locking formation, and cut-out in the wall between bearing areas all contribute to providing a release tool which can be easily be positively and correctly located over the inlet and outlet of the magnetic separator housing. This ensures that the release tool is properly seated on the housing, avoiding the possibility that the magnetic separator will become stuck to the plumbing because the release tool is incorrectly seated and cannot be operated on the collets of the push-fit connectors.

The handle may be provided substantially centrally of the release tool, the same distance from each bearing area, for providing an even force on both bearing areas. In particular, the handle may be provided on a centre-line between the bearing areas.

A raised area may be provided on each bearing area. The raised areas may be provided on an outer side of each bearing area, that is, around the point on the bearing area which is most distant from the central handle region. The raised areas ensure that the release tool provides an even force across opposing sides of the connectors on the separator device.

The release tool may be made from a material which is to some extent elastically deformable, for example, hard plastics. As force is applied to the handle region, the release tool may deform slightly, the sides of the bearing areas closest to the handle portion forming a pivot against the connectors of the separator device, and the distal sides of the bearing areas coming away from the connector. The raised areas compensate for this.

A wall may extend perpendicularly from at least part of the edge of at least one of the bearing areas. In use, the wall forms a guide area around the inlet and outlet of the separator device. The wall also extends around and obstructs access to the release mechanism, limiting the possibility of accidental release while the device is locked. The wall also keeps dirt from entering the fitting mechanism, which otherwise might cause malfunction or leakage in the connectors.

The bearing areas of the release tool may be adjacent each other, and where a wall is provided around each bearing area, part of the wall around one bearing area may also be part of the wall around the other bearing area. In other words, the bearing areas may be separated by a wall which is perpendicular to the bearing areas. Where such a separating wall is provided, a cut-out may be provided in the wall, and a corresponding protrusion may be provided between the inlet and outlet of the separator housing. This arrangement assists with locating the release tool over the inlet and outlet.

Alternatively, the bearing areas of the release tool may be spaced from each other, with a handle region disposed substantially between the bearing areas. Clearly, the space between bearing areas in a particular embodiment will correspond with the space between the inlet and outlet of the separator housing.

According to a second aspect of the invention, there is provided a release tool for releasing connectors on the inlet and outlet of a magnetic separator for a central heating system, the release tool having first and second bearing areas for bearing against the inlet and outlet connectors, and a handle region for enabling force to be applied, via the bearing areas, to both connectors simultaneously.

According to a third aspect of the present invention, there is provided a magnetic separator for use in a central heating system including:
  a housing, having a curved outer surface and a central longitudinal axis;
  an inlet and an outlet extending perpendicularly from the curved outer surface of the housing, the inlet and the outlet being centrally disposed on an axis, the axis running parallel to the central longitudinal axis of the housing; and
  an extension from the curved outer surface of the housing, between the inlet and the outlet, the extension forming a raised and substantially flat surface in a plane parallel with the central longitudinal axis, for bearing against a locking member of a release tool.

The raised flat surface may be in a plane parallel with the central longitudinal axis, and also parallel with a tangent of the curved outer surface.

The raised flat surface formed by the extension provides a flat bearing surface for the locking member of the release tool of the third aspect of the invention. A locking member bearing against a curved surface would have a small contact area, and hence exert considerable pressure on the curved housing, risking damage. Providing a flat bearing surface increases the contact area, reduces the pressure, and limits the possibility of the housing being damaged by a locking member.

The raised flat surface may be embossed with quality control and other markings. Nevertheless, the surface is substantially flat.

The inlet and outlet may include releasable connectors for securing the inlet and outlet of the separator to pipes. The releasable connectors may be releasable by means of a collet surrounding the entrance to each of the inlet and outlet, the connectors releasing when the collets are pushed inwardly, towards the body of the separator device. For example, the connectors may be JOHN GUEST SPEEDFIT® connectors.

BRIEF DESCRIPTION OF THE DRAWINGS

For a better understanding of the present invention, and to show more clearly how it may be carried into effect, reference will now be made, by way of example only, to the accompanying drawings, in which.

DESCRIPTION OF THE PREFERRED EMBODIMENT(S)

Figure 1:
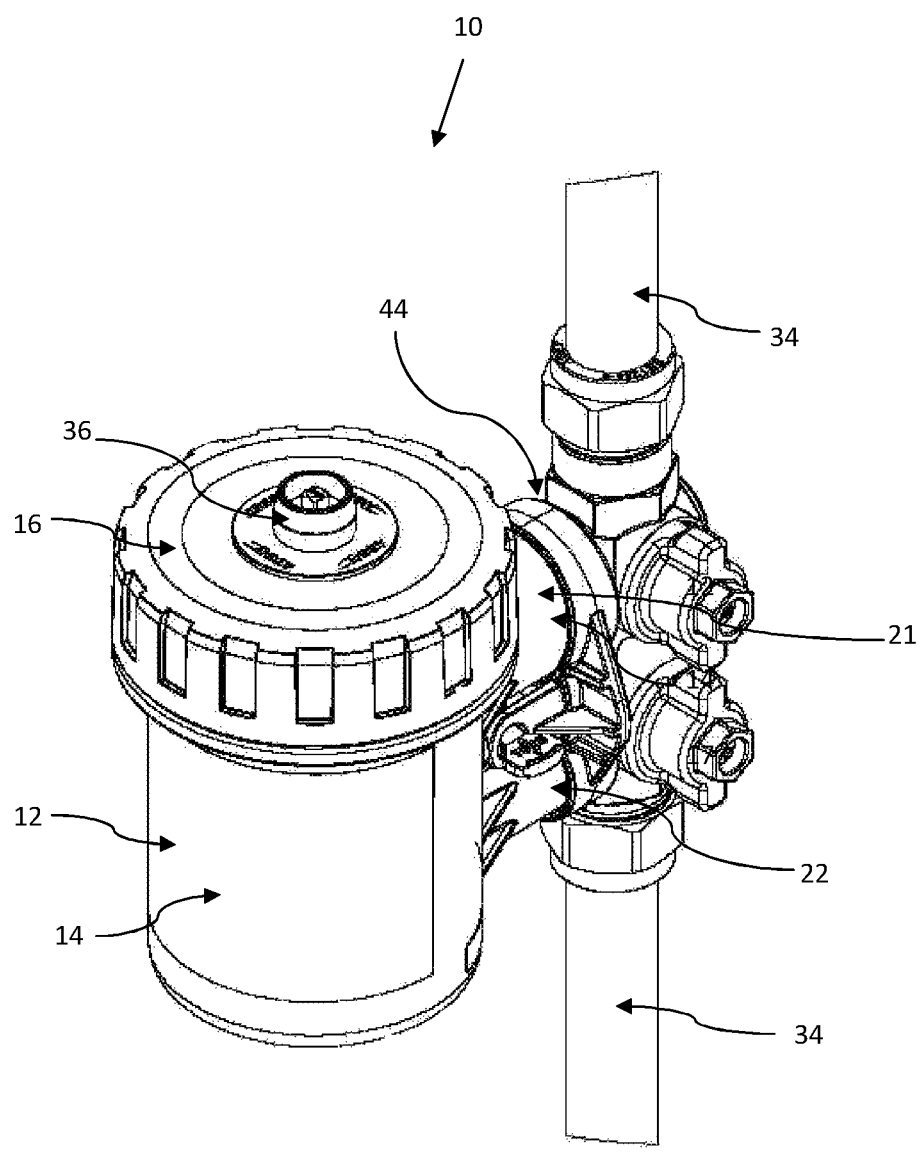
FIG. 1 shows a perspective view of a first embodiment of magnetic separator device comprising a release tool connected to valves and piping of a central heating circuit.
Figure 5:
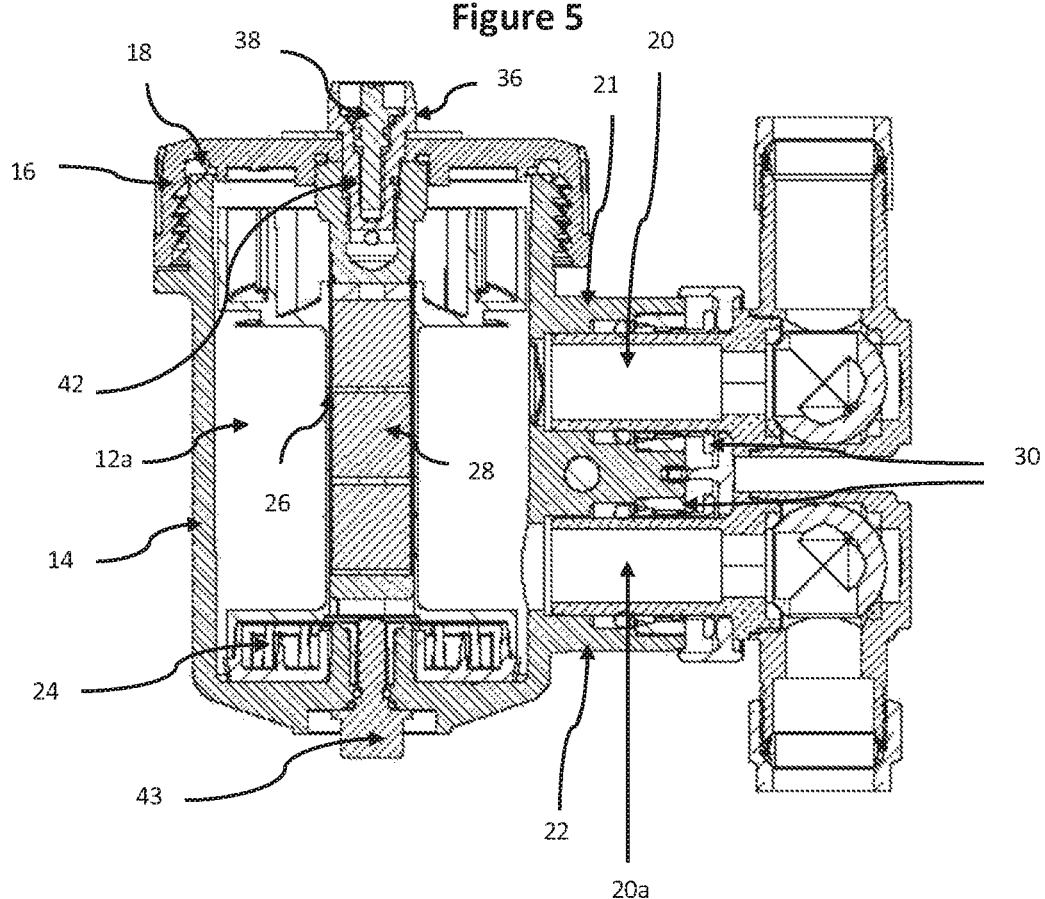
FIG. 5 shows a cut away view through the assembled separator device, release tool and valves of FIG. 1.

Referring firstly to FIGS. 1 and 5, a separator device for separating particles from suspension in a fluid is indicated generally at 10. The separator has a housing 12 including a body portion 14 and a removable closure portion 16. A separation chamber 12a is within the housing. The closure portion 16 is in the form of a screw-on cap, which screws onto the upper end of the housing 12 and an O-ring 18 located in a circumferential groove forms a watertight seal.

Inlet and outlet ports 21, 22 are provided as first and second hollow cylindrical sockets 20a, 20b in the wall of the housing body 14. The central axes of the ports 21, 22 are parallel and lie one above the other on a diameter of the housing. In other words, the ports are adjacent one another and face in the same direction extending perpendicular to a tangent of the cylindrical body. An insert assembly 24 is disposed within the housing. The insert assembly 24 includes a thin plastics sleeve 26, containing one or more magnets 28, for removing magnetic debris from flow through the separator. The insert assembly is described in detail in co-pending applications GB 1219752.1 and PCT/GB2013/051330.

JOHN GUEST SPEEDFIT® connectors 30 are provided within the sockets 20, 20 a, allowing easy fitting to a heating circuit. The sockets 20, 20 a receive sections of pipe 25, which can be part of a valve or other fitment, and the JOHN GUEST SPEEDFIT® connectors 30 grip the pipe sections and form a sealed watertight connection. The JOHN GUEST SPEEDFIT® connectors 30 include collets which, when pushed inwardly towards the housing body, release the grip on the pipe 25, allowing removal. The JOHN GUEST SPEEDFIT® connectors allow for easy fitting and removal of the separator device 10 from a heating circuit.

The parallel inlet and outlet sockets 30 are aligned on the same radial plane and enable easy fitting to a heating circuit, since the inlet and outlet will be in the same straight pipe line 34, shown in FIG. 1, when the device is installed.

A bleed valve assembly 36 is provided through the centre of the screw-on cap 16. The assembly 36 includes a plug 38, which is sealed by O-rings, and is screwed into a threaded aperture 40 within the housing 12. The threaded aperture 40 is provided in a mounting member 42 extending from the underside of the screw on cap 16. The mounting member 42 also incorporates the one or more of the magnets 28.

A drain valve 43 comprising of a screw-in plug with seal is provided in the floor of the housing body 14.

Figure 2:
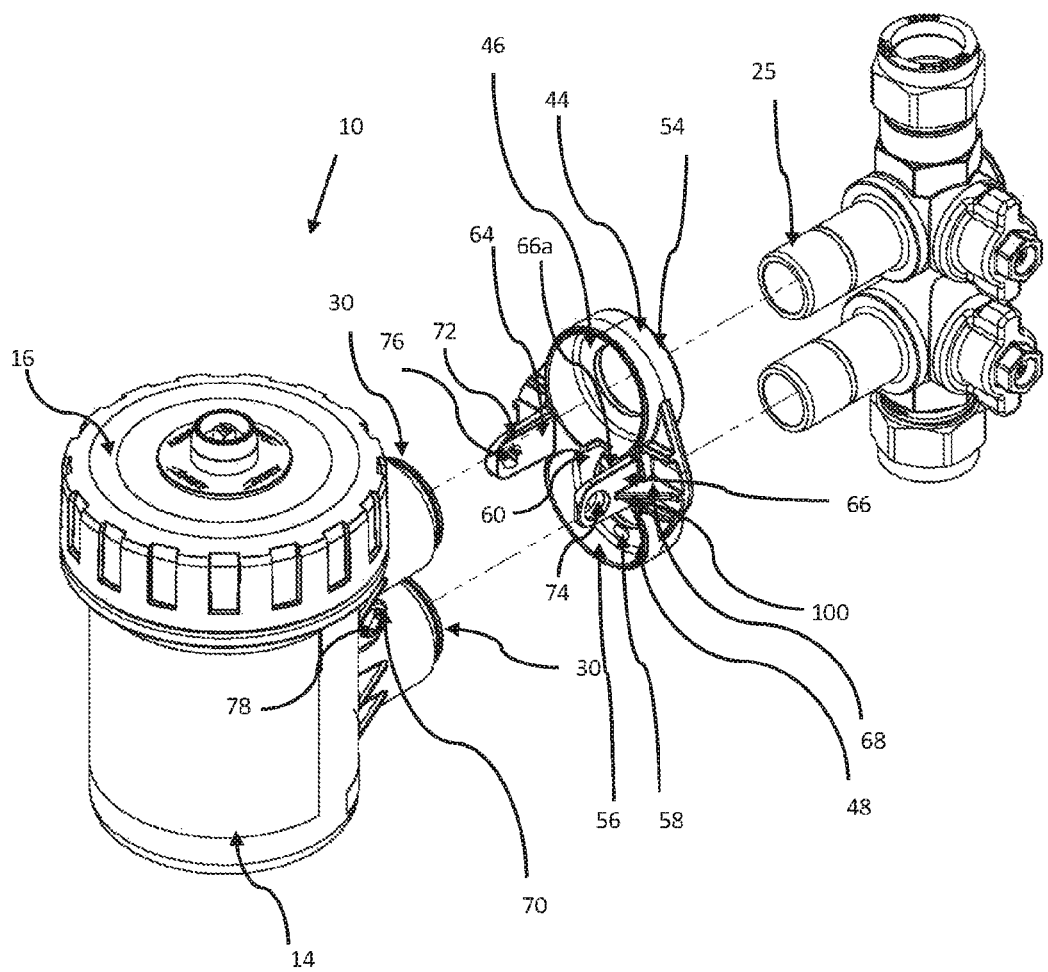
FIG. 2 shows a perspective exploded view of the separator, release tool and valves of FIG. 1.
Figure 3:
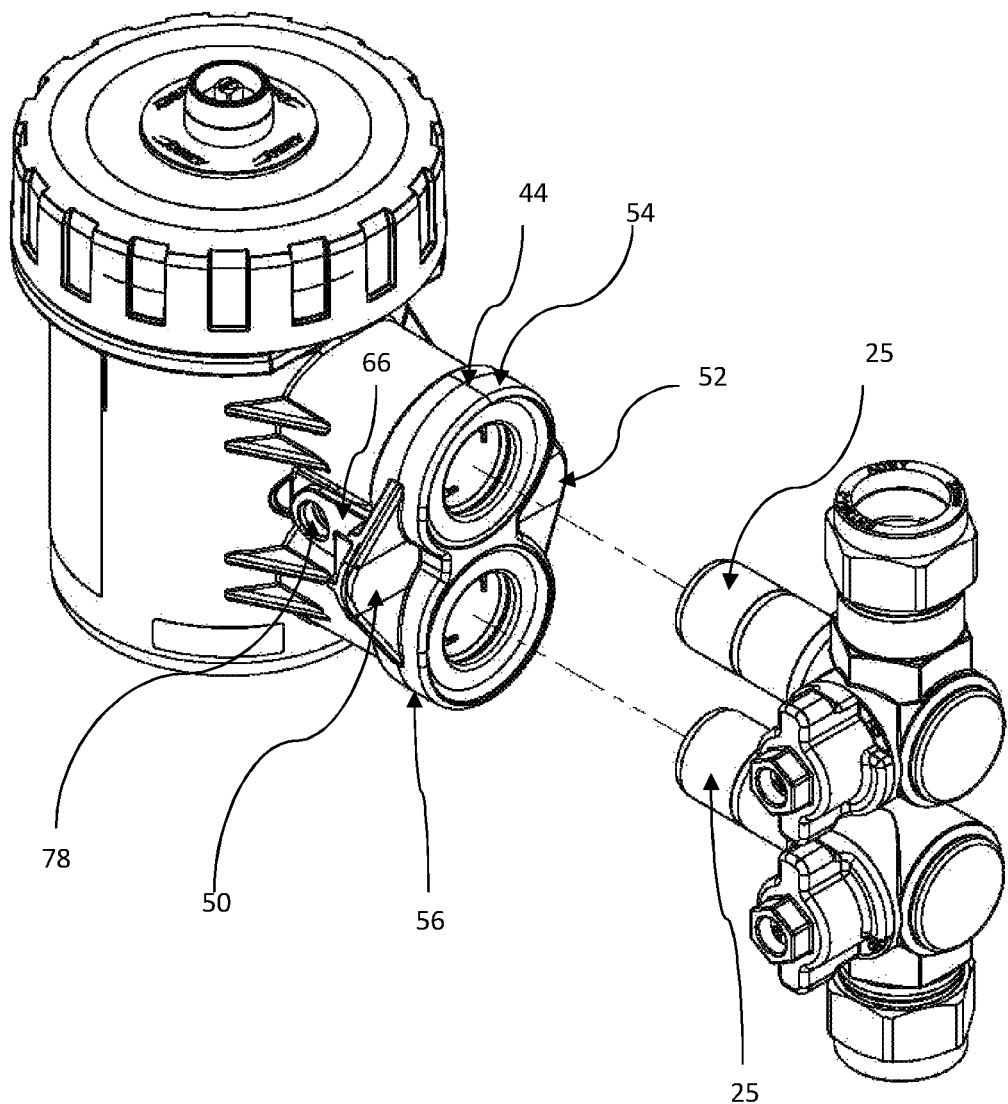
FIG. 3 shows a perspective view of the separator and valves of FIG. 1 prior to assembly.
Figure 4:
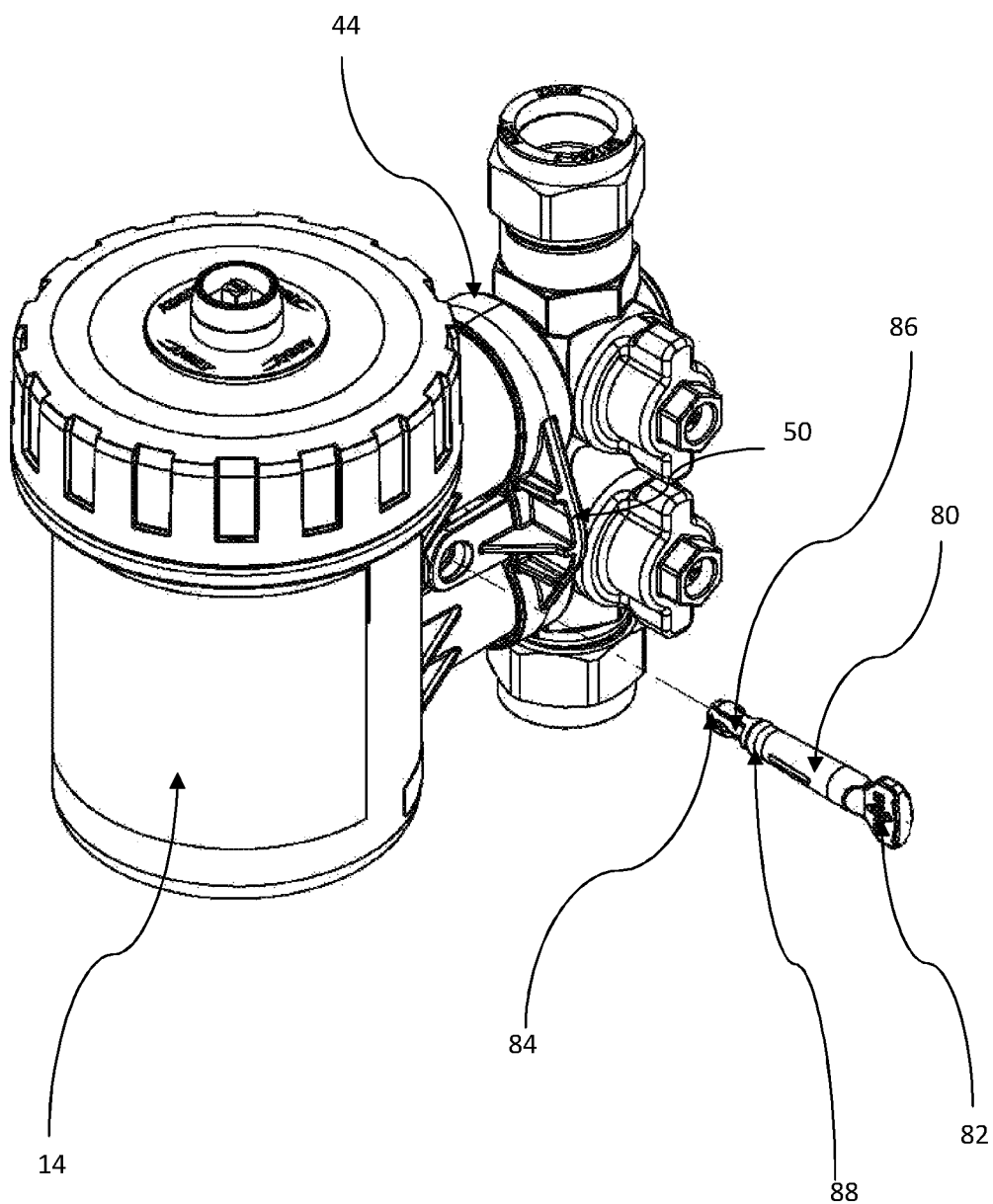
FIG. 4 shows a perspective view of the separator device and valves of FIG. 1 connected together and the insertion of a locking pin.

Referring also to FIGS. 2 to 4, a release tool for simultaneously releasing the JOHN GUEST SPEEDFIT® connectors 30 from the pipes is shown generally at 44. The release tool 44 is formed as a single component and includes two separate bearing areas 46, 48, which are circular and apertured at their centres to allow the pipes to pass through. The bearing areas 46, 48 lie one above the other and align with the ends of the sockets 20, 20 b, in use. Handle portions 50, 52 are disposed on either side of the bearing areas 46, 48 in the form of dished pads, which can be pressed with ease. By providing the handle portions between and on either side of the bearing areas, even pressure can be applied to the bearing areas 46, 48 by hand. Also, raised areas 58, one of which can be seen in FIG. 2, are provided on the faces of the bearing areas 46, 48, which ensure that force is applied at least to upper and lower areas of the ends of the JOHN GUEST SPEEDFIT® connectors, ensuring their release.

The bearing areas are substantially surrounded by outer circumferential flanges or walls 54, 56, which give the release tool rigidity. Where the walls 54, 56 meet, between the bearing areas 46, 48, a cut out 60 is provided. This cut out fits around a reinforcing wall provided between the sockets 20, 20a.

Arms 64, 66 (best seen in FIG. 2) extend away from the circumferential flanges 54, 56, substantially behind the handle portions 50, 52. Angled strengthening members 68 reinforce the connection of the arms 64, 66 to the rear of the handle portions 50, 52. A rib 66a runs along the inside edge of one of the arms and locates in a slot 70 on the separator housing (see FIG. 2). The rib and slot serve as co-operating guide means. No such slot is provided on the other side of the housing, meaning that the release tool can only be engaged with the housing in one orientation, because if engaged the other way, the slot runs up against a part of the housing 14.

Apertures 72, 74 are provided through the ends of the arms 64, 66, with the aperture 74 being larger. It is also slightly tapered towards the other aperture 72. Aperture 72 is circular, but has two internal detents 76, opposing one another. A through aperture 78 is provided through a reinforced region of the housing, between the sockets 20, 20a. The aperture 78 is tapered and has a minor step change in diameter close to the end of the aperture, at the smaller end. The diameter of the aperture increases at the step change (ie opposed to the taper).

A tapered locking pin 80, best shown in FIG. 4, is provided with a handle or finger grip 82 at the larger end. At the other end, opposing longitudinal slots 84 are provided which terminate in partial circumferential slots 86. These slots 84, 86 are designed to engage the detents 76 in the aperture 72 of the arm 64. Also, an O-ring 88 is located in a circumferential slot in the locking pin 80, positioned in proximity to the slots 84, 86 at the smaller end of the locking pin.

Figure 6:
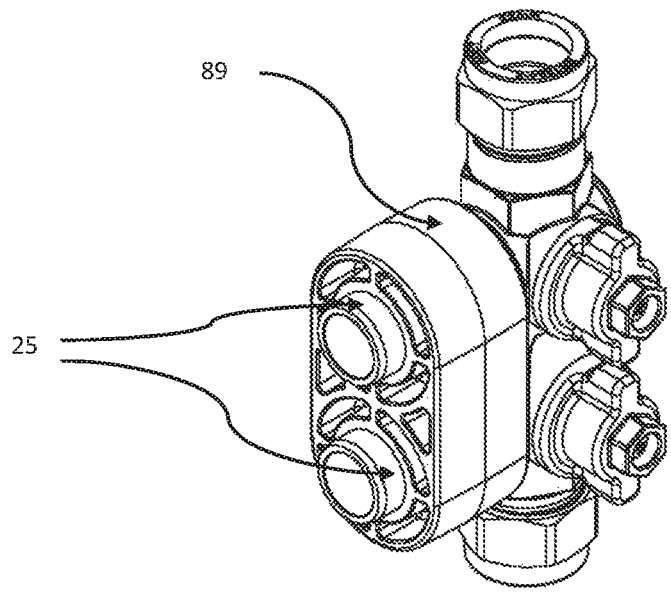
FIG. 6 shows a perspective view of a fitting jig, attached to the valves of FIG. 1.
Figure 7:
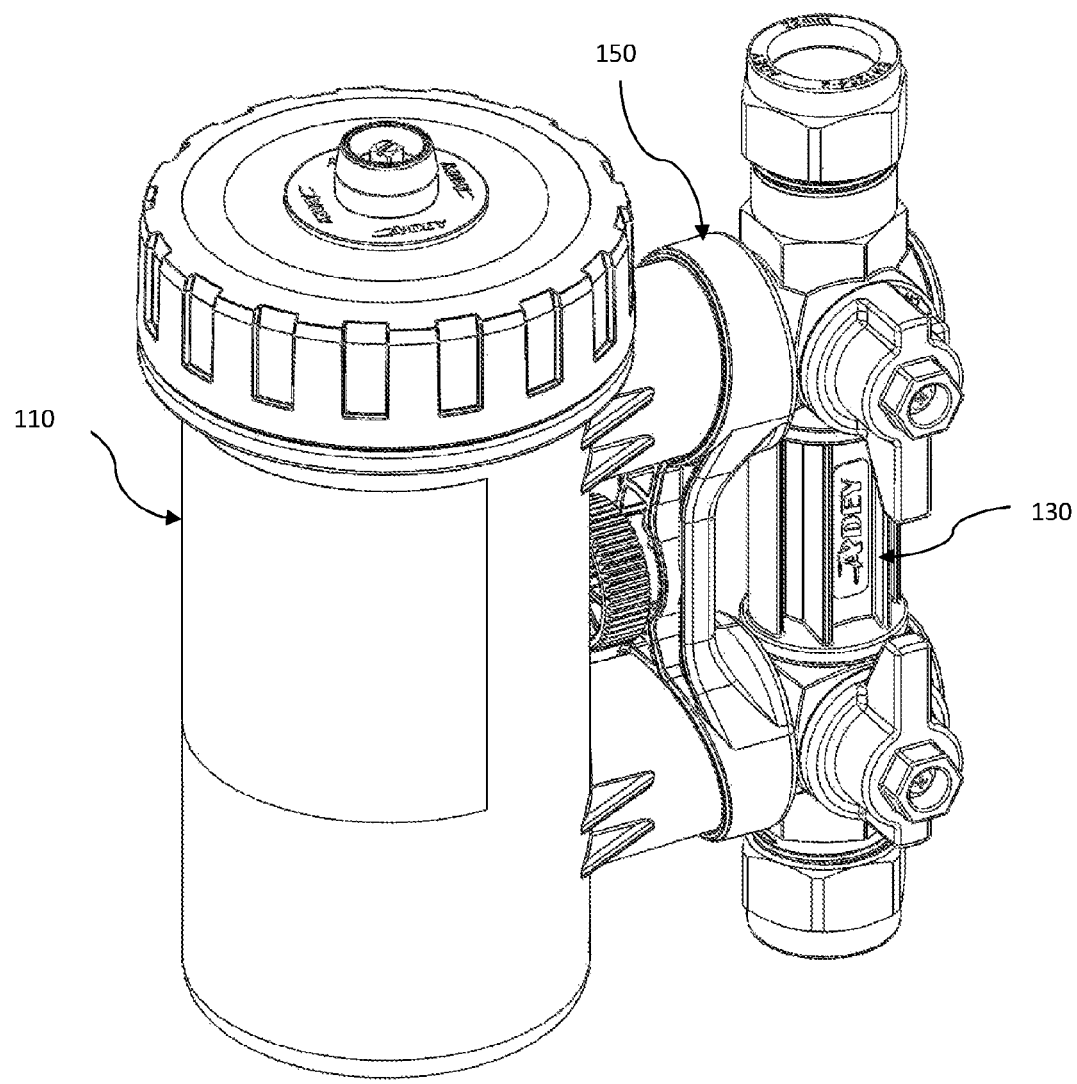
FIG. 7 shows a perspective view of a second embodiment of separator device comprising a release tool connected to valves for connection to a central heating circuit.

In use, when the magnetic separator 10 is fitted, the pipes are aligned in readiness to the centre distances of the sockets 20, 20 a, utilising a spacing guide 89 as shown in FIG. 6. The release tool 44 is pre-mounted to the separator 10, as shown in FIG. 3, and the release tool 44 and housing 14 are then moved towards the pipes 25 and the pipes engaged in the sockets 20, 20 a. The connections of the sockets 20, 20 a to the pipes are automatic, instant and simultaneous.

In this position, it will be appreciated that the release tool 44 can move back and forth along the pipes 25 relative to the housing 14. To prevent this movement, the apertures 72, 74 in the arms are aligned with the aperture 78 of the housing and the locking pin 80 inserted. The pin will only enter from one side of the housing, due to the tapered nature of the apertures. The detents 76 pass through the longitudinal slots 84 in the pin, and then the pin is rotated, so that the detents are located in the part circumferential slots 86, this preventing withdrawal of the pin in the manner of a bayonet connection. The O-ring also engages on the larger diameter side, where the step change occurs in the diameter of the tapered aperture 78 and serves as a further locking means resisting withdrawal of the pin. In the locked position, the bearing areas are spaced from the ends of the sockets, thus preventing release of the pipes 25 from the separator.

When a heating system is serviced and it is required to remove the separator 10 for cleaning, because access to the separator is tight, following isolation for the circuit, the locking pin is twisted and removed, both of the handle portions 50, 52 are pressed simultaneously with even pressure by hand, and the bearing areas act against the ends of the collets of the JOHN GUEST SPEEDFIT® connectors 30, thus simultaneously releasing them from both pipes 25. The magnetic separator can then be removed.

Referring now to FIGS. 7 to 11, a second embodiment of release tool for use with separator device 110 is shown generally at 150. The release tool 150 comprises two circular discs 152, each having a circular aperture at its centre, a wall 154 extending from the edge of each disc 152, and a connecting handle member 156 between the discs 152. A circular locking member 158 includes a female threaded section through its centre, and a corresponding male threaded section 160 extends perpendicularly from the connecting member 156. The circular locking member 158 is screwed on to the male threaded section 160, the distance between the locking member 158 and the connecting handle member 156 being adjustable by rotating the locking member 158 to move it along the male threaded section 160.

Figure 10:
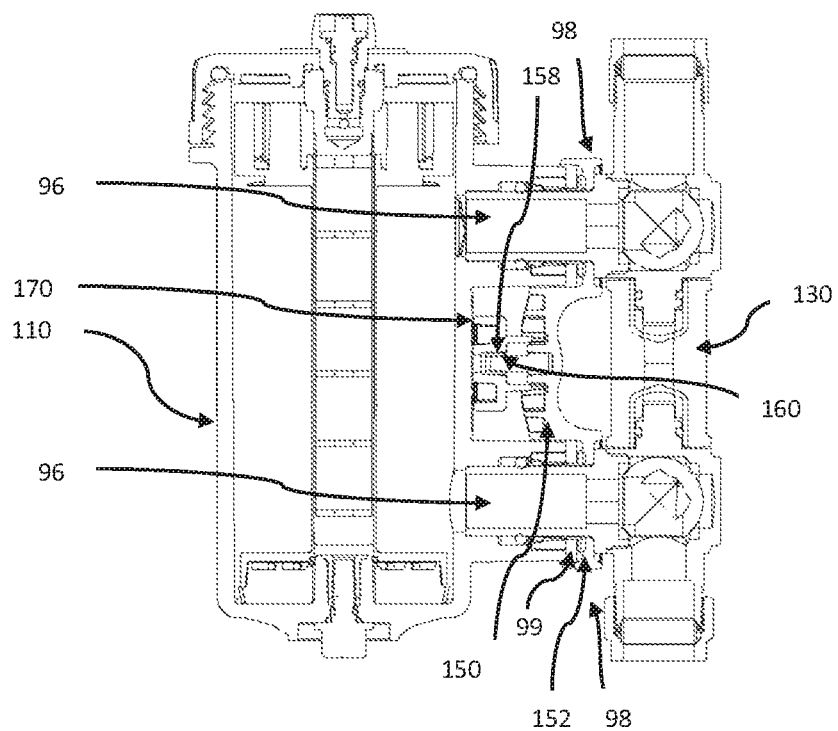
FIG. 10 shows a cut-away view of the release tool fitted between the separator device and the valves of FIG. 7, in which the release tool is locked to prevent release.

JOHN GUEST SPEEDFIT® connectors 98 on the inlet and outlet 96 of the separator device 110 include collets 99, which when pushed towards the body of the separator device 10 allow the separator device 10 to be released from the connected pipe fitment 130, as in the previous embodiment. When the separator device is installed, the release tool 150 is placed over the pipe portions 136 of the pipe fitment 130 so that the pipe portions 136 extend through the apertures in the discs 152 of the release tool. The JOHN GUEST SPEEDFIT® connectors 98 on the separator device 10 are then engaged with the pipe portions 136 of the fitment 130. The locking member 158 is rotated so that it moves along the male threaded section 160, away from the connecting handle member 156, until it is adjacent to the flat raised section 170 on the curved surface of the body of the separator device 110, as shown in FIG. 10. With the locking member adjacent to the separator device, the SPEEDFIT® connections 98 cannot be disengaged, since the collets 99 are inaccessible.

The flat section 170 allows a tight fit against the locking member, whilst reducing the pressure by increasing the contact area, limiting the possibility of damage.

Figure 9:
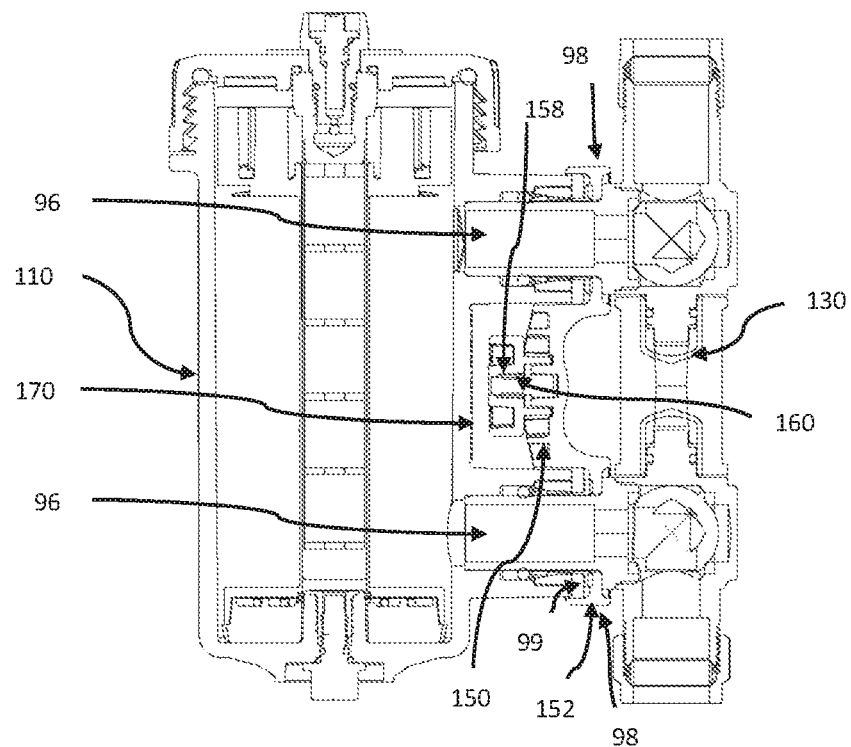
FIG. 9 shows a cut-away view of the release tool fitted between the separator device of and the valves of FIG. 7, in which the release tool is unlocked to allow release.

When the separator device needs to be removed from the pipe fitment, for example for cleaning, the locking member 158 is rotated so that it moves along the male threaded section 160, towards the connecting handle member 156 and away from the body of the separator device, as shown in FIG. 9. With the locking member 158 adjacent to the connecting handle member 156, the release tool 150 may be moved towards the body of the separator device 110, the discs 152 having bearing surfaces which engage with the collets 99 of the SPEEDFIT® connectors 98 to release the connection.

Figure 8:
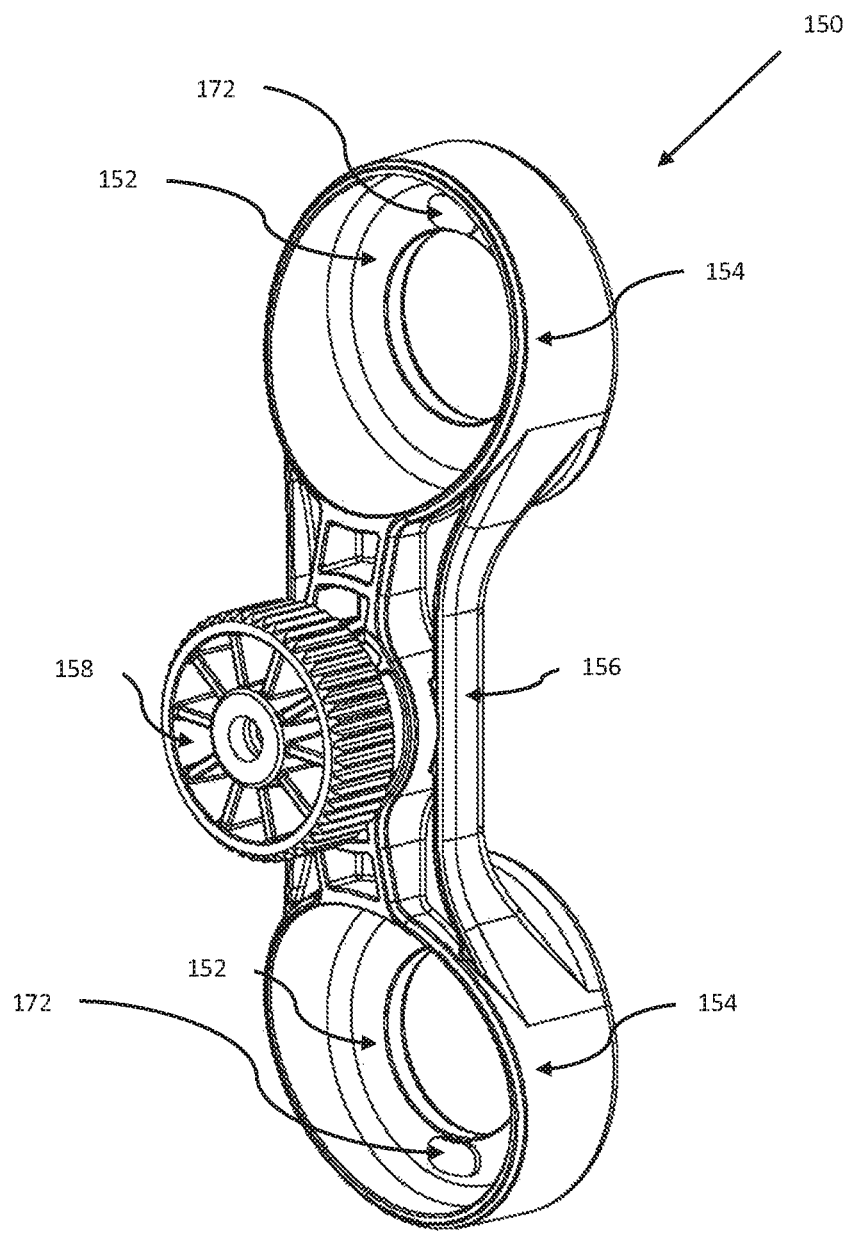
FIG. 8 shows a perspective view of a release tool according to the second aspect of the invention, for use with the separator device of FIG. 7.

As seen best in FIG. 8, the release tool 150 includes raised areas 172 on outer edges of the bearing areas 152, as in the first embodiment. The raised areas ensure that even force is provided on either side of the collets 99 in use. The release tool 150 is slightly curved and also may deform very slightly in use, the outer edges (furthest from the handle portion) bending away from the direction of the force applied to the handle portion. The raised areas 172 compensate for this, ensuring that the release tool pivots against the outer edges of the collets rather than the inner edges, so that the inner edge pushes into the collet when force is applied, rather than the outer edge moving away from the collet. In this way an even force is applied across opposing sides of the connectors and they release easily.

The release tools disclosed allow for secure fitting and yet easy release of the separator devices 10, 110. Because the separator devices 10, 110 may easily be completely removed from the pipework 25, additional flexibility is provided to the installer when the separator device is being initially located. The possibility of fast release means that it is not necessary to provide enough space above the separator device to unscrew the closure portion 16 and remove the removable insert 24 whilst the device is in situ. This allows installation, for example, between the bottom of a boiler and a countertop, where service and cleaning of the separator device would otherwise be impossible.

Figure 11:
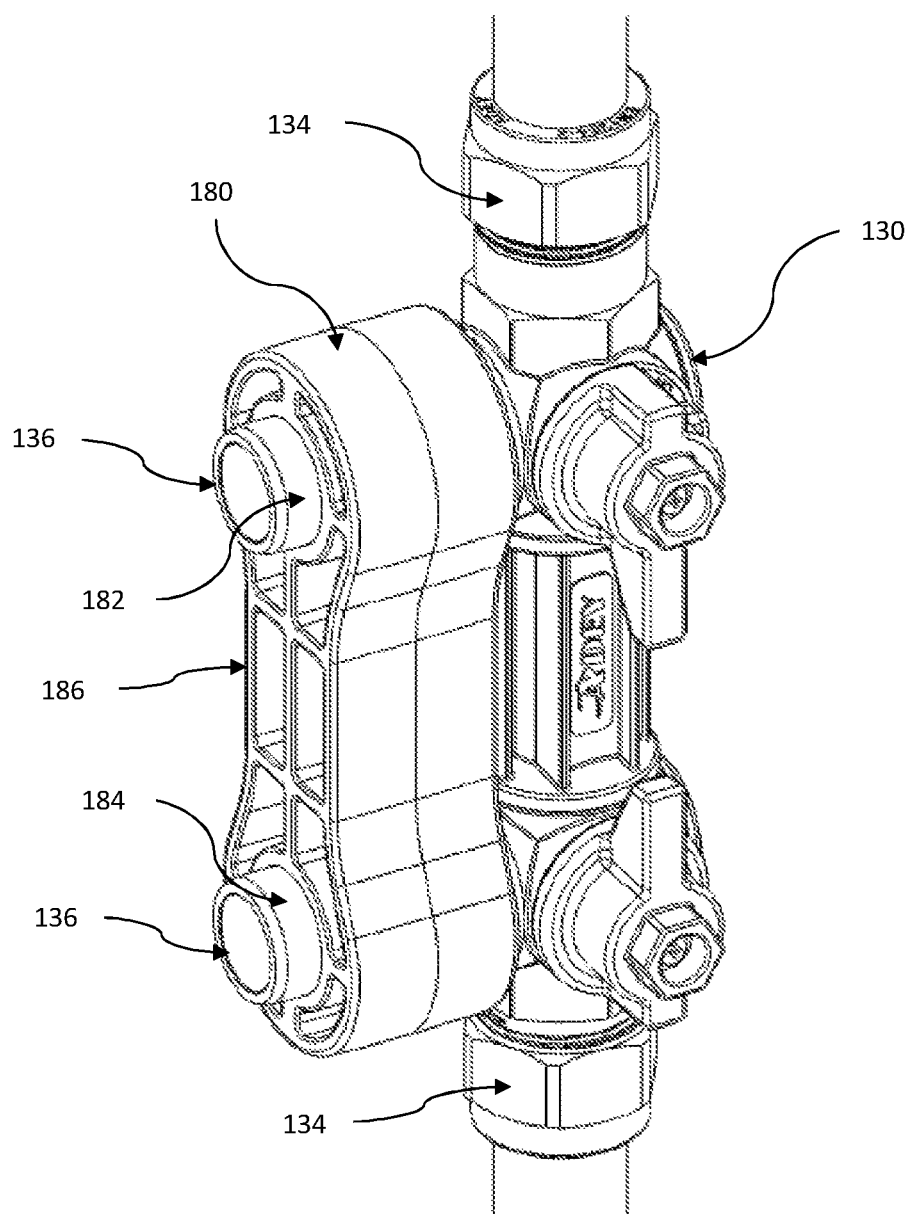
FIG. 11 shows a perspective view of a fitting jig, attached to the valves of FIG. 7.

Referring now to FIG. 11, a fitting jig is indicated at 180, connected to the pipe fitment 130. The fitting jig comprises a pair of apertures 182, 184 for receiving first and second pipe portions, and a connecting section 186 spacing the apertures 182, 184 a fixed distance apart. The axes of the apertures 182, 184 are parallel and have a depth of between 10 mm and 30 mm, preferably around 25 mm. The apertures are a clearance fit on the first and second pipe portions, and the apertures slide on to the pipe portions, holding them accurately and firmly in line relative to one another. The fitting jig allows easy alignment of the first and second pipe portions 136, so that they are in the correct position for fitting of the separator device 10. If the separator device itself is used for this purpose, there is a danger of damage when torque is applied to the compression fittings 134. Use of the jig avoids this risk.

The embodiments described above are provided by way of example only, and various changes and modifications will be apparent to persons skilled in the art without departing from the scope of the present invention as defined by the appended claims.

The invention claimed is:

1. A magnetic separator for a central heating system, the magnetic separator comprising:
   a housing;
   a separation chamber within the housing;
   a magnet within the housing;
   inlet and outlet ports extending from the housing, the inlet and outlet ports including push-fit connectors having collets surrounding a mouth of each of the inlet and outlet ports, the collets being pushable inwardly in a direction parallel to central axes of the inlet and outlet ports and towards the housing for releasing the connectors;
   a release tool, the release tool having first and second bearing areas for bearing against the collets of the connectors of the inlet and outlet ports, and a handle region for enabling force to be applied, via the bearing areas, to both of the push-fit connectors simultaneously; and
   a locking member for locking the release tool in a position where force cannot be transmitted to the collets via the bearing areas.

2. The magnetic separator of claim 1, wherein the locking member engages with part of the housing and militates against movement of the release tool towards the housing.

3. The magnetic separator of claim 2, wherein the locking member is extendable from the release tool.

4. The magnetic separator of claim 3, wherein the locking member is a screw threaded stop that extends from the handle region of the release tool and is adapted to engage against a side of the housing.

5. The magnetic separator of claim 1, wherein the locking member is a pin.

6. The magnetic separator of claim 5, wherein the release tool and housing each have at least one aperture for receiving the pin, the at least one aperture of the release tool being aligned with the at least one aperture of the housing in a position where the release tool is spaced from the housing and the bearing areas of the release tool are not applying force to the collets.

7. The magnetic separator of claim 6, in which the pin has a locking formation for locking the pin within the apertures.

8. The magnetic separator of claim 7, wherein the locking formation has a longitudinal passage extending from an end of the pin, along a surface of the pin, and a circumferential passage extending from the longitudinal passage, the circumferential passage being spaced from the end of the pin.

9. The magnetic separator of claim 8, wherein a detent corresponding to the locking formation is provided on the at least one aperture in the release tool or the housing, the detent extending inwardly from a periphery of its associated aperture.

10. The magnetic separator of claim 5, wherein the pin is tapered.

11. The magnetic separator of claim 10, wherein at least one of the apertures in the release tool or the housing is also tapered, thereby allowing the pin to be introduced in only one direction.

12. The magnetic separator of claim 5, wherein an O-ring is mounted about the pin.

13. The magnetic separator of claim 1, wherein the release tool and the housing have co-operating guide formations on one side of the release tool and the housing.

14. The magnetic separator of claim 1, wherein the handle is disposed substantially centrally of the release tool.

15. The magnetic separator of claim 1, wherein each bearing area has a raised area.

16. A magnetic separator for a central heating system, the magnetic separator comprising:
   a housing having a curved outer surface and a central longitudinal axis;
   a magnet within the housing;
   an inlet and an outlet extending perpendicularly from the curved outer surface of the housing, the inlet and the outlet being centrally disposed on a second axis, the second axis running parallel to the central longitudinal axis of the housing, and the inlet and outlet ports including push-fit connectors having collets surrounding the mouth of each of the inlet and the outlet, the collets being pushable inwardly in a direction parallel to central axes of the inlet and outlet ports and towards the housing for releasing the push-fit connectors;
   a release tool, the release tool having first and second bearing areas for bearing against the collets of the push-fit connectors, and a handle region for enabling force to be applied, via the bearing areas, to both of the push-fit connectors simultaneously; and
   an extension from the curved outer surface of the housing, the extension being located between the inlet and the outlet and not in fluid connection with either of the inlet or the outlet, the extension forming a raised and substantially flat surface in a plane parallel with the central longitudinal axis, for bearing against a locking member of the release tool; and
   a locking member for locking the release tool in a position where force cannot be transmitted to the collets via the bearing areas.

* * * * *